United States Patent [19]
Hiller et al.

[11] Patent Number: 5,622,435
[45] Date of Patent: Apr. 22, 1997

[54] PLAIN BEARING HAVING A BEARING GAP FILLED WITH LIQUID METAL

[75] Inventors: Bernhard Hiller, Buckenhof; Edwin Gemmel; Roland Koeppel, both of Erlangen; Wolfgang Kuehnel, Rudolstadt, all of Germany

[73] Assignee: Siemens Aktiengesellschaft, Munich, Germany

[21] Appl. No.: 617,567

[22] Filed: Mar. 19, 1996

[30] Foreign Application Priority Data

Mar. 20, 1995 [DE] Germany ............... 19 510 067.0

[51] Int. Cl.⁶ .............................. F16C 32/06; H01J 35/10
[52] U.S. Cl. ........................... 384/100; 378/133; 384/132
[58] Field of Search ........................... 384/100, 107, 384/132, 368; 378/132, 133

[56] References Cited

U.S. PATENT DOCUMENTS

| | | | |
|---|---|---|---|
| 4,210,371 | 7/1980 | Gerkema et al. | 384/412 |
| 4,614,445 | 9/1986 | Gerkema et al. | 384/368 |
| 4,856,039 | 8/1989 | Roelandse et al. | 378/133 |
| 5,077,776 | 12/1991 | Vetter | 578/133 |
| 5,181,235 | 1/1993 | Ono et al. | 378/133 |
| 5,204,890 | 4/1993 | Anno et al. | 378/133 |

FOREIGN PATENT DOCUMENTS 0479197  4/1992  European Pat. Off. .

Primary Examiner—Thomas R. Hannon
Attorney, Agent, or Firm—Hill, Steadman & Simpson

[57] ABSTRACT

A plain bearing having a bearing gap filled with liquid metal has two plain bearing parts each having a surface contiguous to the liquid metal, these surfaces delimiting a gap connecting the bearing gap with the surrounding space. At least one of the surfaces is provided, in its area contiguous to the liquid metal, with a layer of a material that is effective as a wetting agent for the liquid metal.

8 Claims, 2 Drawing Sheets

PLAIN BEARING HAVING A BEARING GAP FILLED WITH LIQUID METAL

BACKGROUND OF THE INVENTION

1. Field of the Invention

The invention is directed to a plain bearing of the type having a bearing gap filled with liquid metal, with two plain bearing parts each having a surface contiguous with the liquid metal, the surfaces contiguous to the liquid metal lying on one another so as to form a gap connecting the bearing gap with the surrounding space.

2. Description of the Prior Art

Plain bearings having a bearing gap filled with liquid metal, or liquid metal plain bearings for short, are used, for example, in X-ray tubes in order to provide bearings for the rotating anode, and are normally incorporated into the interior of the vacuum housing of the X-ray tube (see e.g. German OS 28 52 908 or European Application 0 479 197). Alloys of gallium, indium or tin, liquid at room temperature, are as a rule used as the liquid metal. Alloys of this sort are highly reactive substances. It is therefore undesirable for liquid metal plain bearings to lose liquid metal. This is particularly true when used in X-ray tubes, since drops of liquid metal that leave the area of the anode can endanger the high-voltage strength of the X-ray tube.

In an X-ray tube having a rotating anode, known from European Application 0 373 705, the surfaces, arranged opposite one another, of a rotor that is connected to the rotating anode and rotates with it, as well as the surfaces of a stationary carrier part, are provided with a layer of a material (gold) that is effective as a wetting agent for the liquid metal and binds reactively with it. This prevents drops of liquid metal that emerge from the liquid metal plain bearing, which is provided as a bearing arrangement for the rotating anode, from leaving the area of the anode.

In the liquid metal plain bearing known from European Application 0 141 476, the surfaces in question are provided with a coating of titanium oxide, which is effective as an anti-wetting agent for the liquid metal, in order to prevent the emergence of liquid metal through a gap located between two plain bearing parts lying on one another. Though it is true that this coating effectively prevents the emergence of liquid metal from the bearing gap, the danger nonetheless exists at the same time that gases can penetrate into the filled liquid metal plain bearing and form dangerous gas bubbles. In liquid metal plain bearings provided for X-ray tubes, this danger of course exists only if the vacuum housing of the X-ray tube is not properly evacuated.

SUMMARY OF THE INVENTION

An object of the present invention is to provide a liquid metal plain bearing of the type described above wherein the danger of penetration by gases is reduced.

This object is achieved according to the invention in a plain bearing having a bearing gap filled with liquid metal, having two plain bearing parts each having a surface contiguous to the liquid metal, the surfaces contiguous to the liquid metal lying on one another so as to form a gap connecting the bearing gap with the surrounding space, with at least one of the surfaces being provided, in its area contiguous to the liquid metal, with a layer of a material that is effective as a wetting agent for the liquid metal. In the liquid metal plain bearing according to the invention, the wetting and filling of a part of the gap by means of the layer of wetting agent is thus intentionally caused to occur. The liquid metal, held in the gap by capillary forces, functions as a sealing means that seals the gap.

As used herein, the term "contiguous" should not be understood to mean that the area of the surface coated with the wetting agent necessarily borders immediately on the bearing gap. Rather, a clearance or spacing may exist between the two. It is important only that the area coated with the wetting agent extend over the entire length, or in the case of an annular gap, over the entire circumference, of the gap, thus forming a continuous barrier against penetration by gases. Moreover, in contrast to the length or, respectively, to the circumference of the gap, the breadth of the gap means the same spacing that lies between the beginning and the end of the gap. The gap width is the spacing between the surfaces delimiting the gap.

An even better gas tightness is achieved if, according to a variant of the invention, a material that binds reactively with the liquid metal (in particular, if a gallium alloy is used as the liquid metal, a material containing at least one of the group gold, copper, nickel) is provided as a wetting agent, since then the liquid metal functioning as a sealing means is additionally held in place.

In order to ensure that no liquid metal emerges through the gap despite the presence of the wetting agent in the area of the gap, at least one of the surfaces in the area adjoining the area of the gap coated with the material that is effective as a wetting agent is provided with a layer of a material that is effective as an anti-wetting agent for the liquid metal.

If a gallium alloy is used as the liquid metal, a metal oxide, in particular aluminum oxide or titanium oxide, may be provided as the anti-wetting agent. Carbon is also suitable for use as the anti-wetting agent, especially if it is present before the coating as vitrified carbon. Vitrified carbon is commercially available under the name "Sigradur." Further suitable anti-wetting agents are silicon compounds, e.g. silicon oxide ($SiO_2$) or silicon nitride ($Si_3N_4$).

DESCRIPTION OF THE PREFERRED EMBODIMENTS

Figure 1:
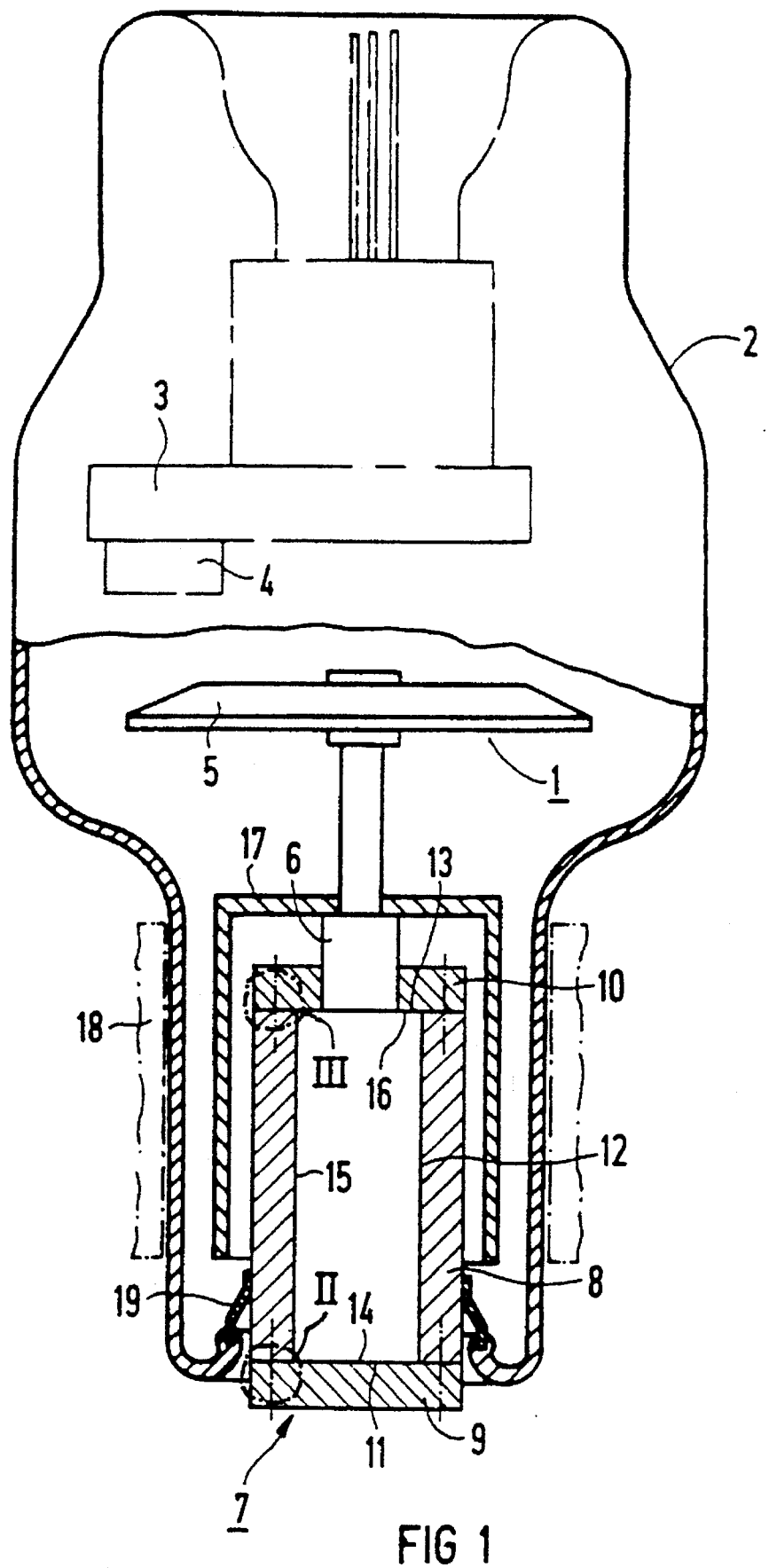
FIG. 1 is a longitudinal section through an X-ray tube with a rotating anode, having a liquid metal plain bearing assembled from inventive plain bearing parts for the rotating anode, shown partly in section.

FIG. 1 shows an X-ray tube with a rotating anode 1 housed in a vacuum bulb 2. The vacuum bulb 2 also contains a cathode 3 arranged in a known manner itself, formed by a filament (not visible in FIG. 1) in a concentrating cup 4.

The rotating anode 1 includes an anode plate 5, fixedly connected to one end of a bearing shaft 6. As a rotational bearing arrangement for the rotating anode 1, a liquid metal plain bearing, designated as a whole with 7, is provided, assembled from several plain bearing parts, one of which is the bearing shaft 6. As further plain bearing parts, a tube part 8, a base 9 and a cover 10 are provided.

The tube part 8, the base 9 and the cover 10, which is provided with a bored hole, are screwed to one another (the representation shows only the construction lines of some of the screws) in such a manner that the thickened end of the bearing shaft 6 extending through the bored hole in the cover 10 is received by the bored hole of the tube part 8. The flat inner side of the cover 10, the hollow cylindrical wall of the bored hole of the tube part 8 and the circularly annular flat inner side of the cover 10 thereby form the first bearing surfaces 11, 12 and 13. The flat annular front surface provided at the other end of the bearing shaft 6, the cylindrical casing surface of the thickened projection of the bearing shaft 6 and the annular flat front surface of the shoulder of the bearing shaft 6 leading over to the thickened projection form the second bearing surfaces 14, 15 and 16.

Between the bearing surfaces 11 to 13 on the one side and the bearing surfaces 14 to 16 on the other, there is located a bearing gap (not visible in FIG. 1) filled with liquid metal, e.g. an alloy of gallium, indium or tin.

For putting the rotating anode 1 into rotation, an electromotor is provided, formed by a rotor 17 in the form of a tube closed at one end, made of an electrically conductive material, that covers the end of the tube part 8 provided with the cover 10. The schematically outlined stator 18 is attached to the outer wall of the vacuum bulb 2 in the area of the rotor 17, and forms with the rotor 17 an electrical squirrel-cage motor that causes the rotating anode 1 to rotate when supplied with the appropriate current.

The plain bearing parts, i.e. the bearing shaft 6, the tube part 8, the base 9 and the cover 10, are formed from a material from the group comprising molybdenum, tungsten, tantalum and rhenium, or from an alloy containing at least one of these, or from high-grade steel, or from ceramic. The plain bearing parts are preferably formed from molybdenum or from an alloy containing molybdenum, due to the vacuum capability of this material.

Figure 2:
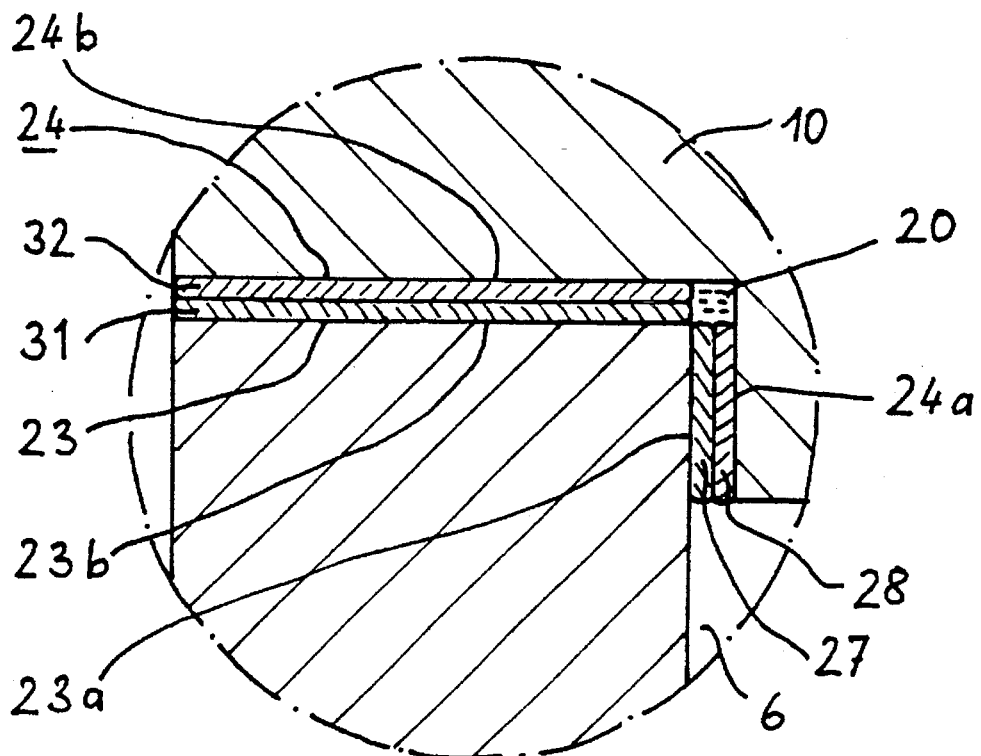
FIGS. 2 and 3, respectively show in an enlarged representation, the details II and III according to FIG. 1.
Figure 3:
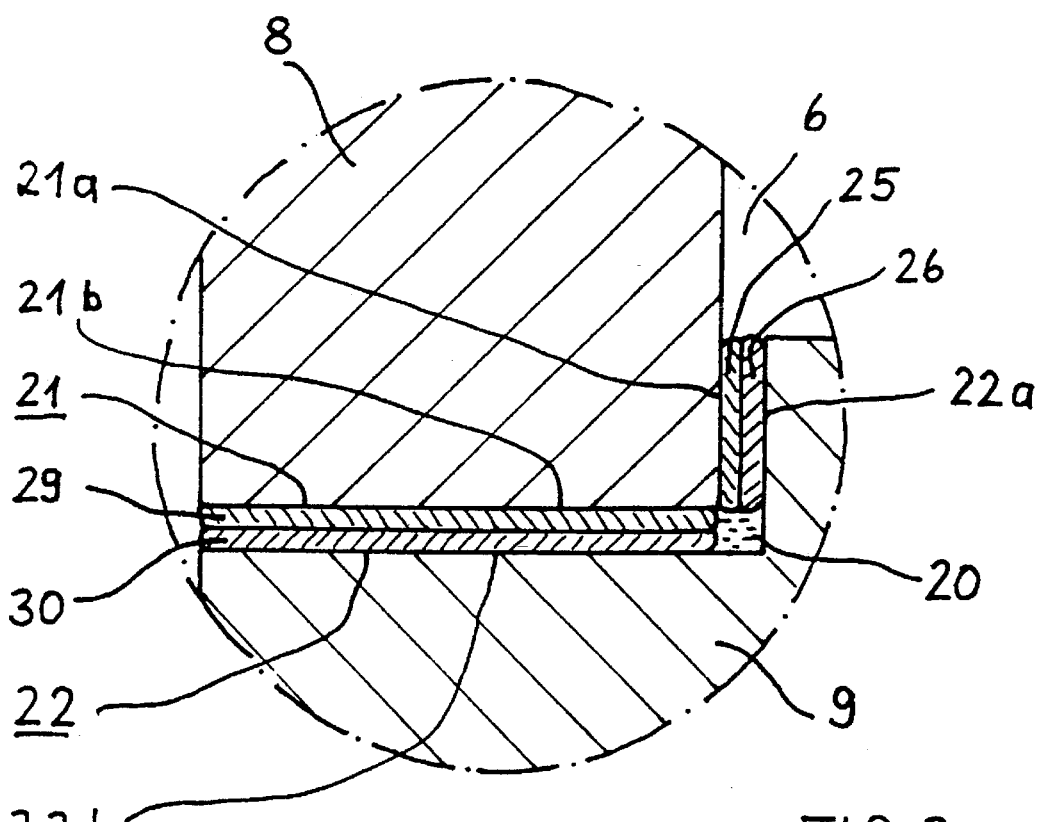

As can be seen in FIGS. 2 and 3, all surfaces 21 and 22 or 23 and 24, of the plain bearing parts 8, 9 and 10, which would otherwise come into direct contact with one another and delimit capillary gaps connecting the bearing gap with the surrounding environment, are provided in the area contiguous to the liquid metal 20 with respective layers 25 and 26, or respective layers 27 and 28, of a material that is effective as a wetting agent for the liquid metal 20. Liquid metal 20 thus enters through the capillary gaps that are present between the plain bearing parts 8, 9 and 10 in the area of their surfaces 21 to 24, and is held there by capillary forces. The liquid metal 20 located in the capillary gaps prevents the entry of gases into the bearing gap as a sealing means, so to speak, before the evacuation of the vacuum bulb 2.

If a material that binds reactively with the liquid metal, (such as e.g. gold, copper or nickel or a material containing at least one of these) is used as the wetting agent, an even better sealing effect is achieved, since the liquid metal is then additionally held in the capillary gaps as a result of the eutectic formation that occurs at the surfaces bordering the layers 25 to 28.

In the exemplary embodiment according to FIGS. 1 to 3, the surfaces 21 to 24 are assembled respectively from cylindrical surface parts 21a to 24a and from annular surface parts 21b to 24b, in order to ensure a centering of the plain bearing parts 8 and 9, or 8 and 10 relative to one another.

In the exemplary embodiment according to FIGS. 1 to 3, the presence of the layers 25 to 28 of the wetting agent is limited to the cylindrical surface parts 21a to 24a. If it should prove useful, however, some or all of the layers 25 to 28 may extend into the circularly annular surface parts 21b to 24b.

In the exemplary embodiment according to FIGS. 1 to 3, the cylindrical surface parts 21a to 24a are respectively completely covered by the respective layers 25 to 28. If the surface parts 21a to 24a have a sufficient breadth, it may suffice under certain circumstances to provide some or all of the surface parts 21a to 24a with the respective layer 25 to 28 only over a part of their breadth.

It is essential that the respective layer 25 to 28 continue uninterruptedly over the entire length, i.e. the entire circumference, of the respective surface 21 to 24, so that the liquid metal 20 entering into the capillary gaps can form an uninterrupted seal.

In certain circumstances, it is also sufficient to provide only one of the surfaces 21 or 22, or one of the surfaces 23 or 24 with a layer of a material effective as a wetting agent for the liquid metal 20.

In order to impede the emergence from the bearing of liquid metal 20 that has entered the capillary gaps, the areas of these surfaces bordering on the areas of surfaces 21 to 24 coated with the wetting agent and thus wetted with liquid metal 20 are respectively provided with a layer 29 to 32, made of a material that is effective as an anti-wetting agent for the liquid metal 20. An emergence of the liquid metal 20 from the capillary gaps is then practically impossible, since the liquid metal 20 cannot wet the layers 29 to 32 and since these layers are closer to the surrounding environment then the layers 21 to 24.

As material for the layers 29 to 32, a metal oxide, carbon, silicon oxide or silicon nitride can be used.

In the exemplary embodiment according to FIGS. 1 to 3, the annular surface parts 21b to 24b are respectively completely covered with the respective layer 29 to 32. If the surface parts 21b to 24b have sufficient breadth, however, it may suffice under certain circumstances to provide some or all of the surface parts 21b to 24b with the respective layer 29 to 32 over only a part of their breadth.

In the exemplary embodiment according to FIGS. 1 to 3, the layers 25 and 29, 26 and 30, 27 and 31, and 28 and 32, respectively, are essentially contiguous to one another. Spacings may be present between some or all neighboring layers 25 and 29, 26 and 30, 28 and 31, and 28 and 32, however, if this should prove advantageous, e.g. for manufacturing reasons.

Under certain circumstances it also suffices for only one of the surfaces 21 or 22, or one of the surfaces 23 or 24 to be provided with a layer of a material that is effective as an anti-wetting agent for the liquid metal 20.

Moreover, the bearing surfaces 11 to 16 may be provided, in a known way not shown in the figures, with grooves, such as grooves having a spiral form, the grooves additionally serving to prevent the liquid metal 20 from emerging from the bearing gap.

The thickness of the layers 25 to 32 is represented in an exaggerated fashion in FIGS. 1 and 2 for clarity. A thickness is sufficient that ensures that a closed layer 25 to 32 is present.

Although modifications and changes may be suggested by those skilled in the art, it is the intention of the inventors to embody within the patent warranted hereon all changes and modifications as reasonably and properly come within the scope of their contribution to the art.

We claim as our invention:

1. In a plain bearing having a bearing gap filled with liquid metal and having two relatively movable plain bearing parts each having a surface contiguous to said liquid metal and said surfaces being disposed adjacent each other and forming a gap placing said bearing gap in communication with a surrounding environment, the improvement comprising:

a layer disposed on at least one of said surfaces in an area of said at least one of said surfaces contiguous with said liquid metal, said layer comprising a material effective as a wetting agent for said liquid metal.

2. The improvement of claim 1 wherein said material effective as a wetting agent comprises a material which binds reactively with said liquid metal.

3. The improvement of claim 2 wherein said material effective as a wetting agent contains at least one element selected from the group consisting of gold, copper and nickel.

4. The improvement of claim 1 further comprising a further layer on said at least one of said surfaces, said further layer comprising a material effective as an anti-wetting agent for said liquid metal, said layer and said further layer covering respectively different areas of said at least one of said surfaces.

5. An x-ray tube comprising:

a rotating anode;

means for rotating said anode including a stationary part and a rotating part;

a plane bearing having a bearing gap filled with liquid metal and having two plain bearing parts respectively attached to said rotating part and to said stationary part, said two plain bearing parts each having a surface contiguous to said liquid metal and said surfaces being adjacent each other and forming a gap placing said bearing gap in communication with a surrounding environment; and a layer disposed on at least one of said surfaces on an area of said at least one of said surfaces contiguous to said liquid metal said layer comprising a material effective as a wetting agent for said liquid metal.

6. The improvement of claim 5 wherein said material effective as a wetting agent comprises a material which binds reactively with said liquid metal.

7. The improvement of claim 6 wherein said material effective as a wetting agent contains at least one element selected from the group consisting of gold, copper and nickel.

8. The improvement of claim 5 further comprising a further layer on said at least one of said surfaces, said further layer comprising a material effective as an anti-wetting agent for said liquid metal, said layer and said further layer covering respectively different areas of said at least one of said surfaces.

* * * * *